(12) United States Patent
Wong et al.

(10) Patent No.: US 7,788,515 B2
(45) Date of Patent: Aug. 31, 2010

(54) POWER CONTROL AND STATUS CIRCUITRY FOR COMMUNICATING POWER ON RESET CONTROL AND STATUS VIA A SINGLE ELECTRODE

(75) Inventors: Kern Wong, Sunnyvale, CA (US); Madhavi Tagare, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 590 days.

(21) Appl. No.: 11/835,926

(22) Filed: Aug. 8, 2007

(65) Prior Publication Data

US 2009/0044034 A1 Feb. 12, 2009

(51) Int. Cl.
*G06F 1/00* (2006.01)
*H03K 3/02* (2006.01)
(52) U.S. Cl. .................. 713/330; 713/300; 327/198
(58) Field of Classification Search .................. 713/300, 713/330; 327/198
See application file for complete search history.

(56) References Cited

U.S. PATENT DOCUMENTS

| | | | |
|---|---|---|---|
| 4,788,462 A | 11/1988 | Vesce et al. | |
| 5,070,450 A | 12/1991 | Holman, Jr. et al. | |
| 5,144,159 A * | 9/1992 | Frisch et al. ................. | 327/198 |
| 5,510,741 A | 4/1996 | Childs | |
| 5,734,585 A | 3/1998 | Beard | |
| 6,188,257 B1 | 2/2001 | Buer | |
| 6,237,103 B1 | 5/2001 | Lam et al. | |
| 6,362,669 B1 | 3/2002 | Zhou et al. | |
| 6,615,360 B1 | 9/2003 | Amini et al. | |
| 6,879,139 B2 | 4/2005 | Brown et al. | |
| 6,956,752 B2 | 10/2005 | Miermans | |
| 7,105,947 B1 | 9/2006 | Marshall et al. | |

OTHER PUBLICATIONS

International Search Report for International Application No. PCT/US08/72183 dated Jan. 29, 2009, 3 pp.
Written Opinion for International Application No. PCT/US08/72183 dated Jan. 29, 2009, 3 pp.
International Preliminary Report on Patentability corresponding to International Application No. PCT/US08/72183 dated Feb. 9, 2010, 6 pages.
SMS11, "Four-Channel Voltage Monitor and Sequencer," Summit Microelectronics, Inc., 2006, pp. 1-13.
SMS64, "Six-Channel Supply Monitor and Sequencing Controller," Summit Microelectronics, Inc. 2003, pp. 1-24.
SMR101, Summit Microelectronics, Inc., 2006, pp. 1-9.
Application Note 21, "SMH4804 Power Down Sequencing," Summit Microelectronics, Inc., 2000, pp. 1-5.
A8450, "Automotive Multiouptut Voltage Regulator," Allegro MicroStystems, Inc., A8450KLB-DS, Rev. 2, 2004pp. 1-15.
LTC3548," Dual Synchronous, 400mA/800mA, 2.25MHz Step-Down DC/DC Regulator," Linear Technology Corporation, 2005, pp. 1-16.

(Continued)

*Primary Examiner*—Mark Connolly
(74) *Attorney, Agent, or Firm*—Vedder Price, P.C.

(57) ABSTRACT

A system and method providing, via a single output electrode of an integrated circuit having internal circuitry, a status signal having time multiplexed states indicative of a power on reset condition for external circuitry following enablement of operations of portions of the internal circuitry, and further indicative of subsequent operation statuses of the internal circuitry portions.

15 Claims, 6 Drawing Sheets

OTHER PUBLICATIONS

MAX5072, "2.2MHz, Dual-Output Buck or Boost Converter with POR and Power-Fail Output," Maxim Integrated Products, 2006, pp. 1-27.

MAX5088/MAX5089, "2.2Mhz, 2A Buck Converters with an Integrated High-Side Switch," Maxim Integrated Products, 2006, pp. 1-24.

* cited by examiner

| State | EN1 | RDY1 | EN2 | RDY2 | nPOR | Operation Description |
|---|---|---|---|---|---|---|
| 1. | 0 | 0 | 0 | 0 | 1 | no regulator enabled, nPOR remains 1 |
| 2. | 1 | 0 | 0 | 0 | 1->0 | After EN1=1 and RDY1=0 nPOR remains 0 for as long as RDY1 not asserted |
| 3. | 1 | 1 | 0 | 0 | 1->0->1 | After EN1=1 and RDY1=1 nPOR=0 until an uninterruped 50ms delay is achieved, then nPOR=RDY1. (If RDY1 cycles, the counter resets and nPOR stays logic 0 for 50ms + the duration RDY1 cycles,) |
| 4. | 1 | 1 | 1 | 0 | 1->RDY2 | EN2=1 triggers a mask time of 3ms to anticipate typical RDY2 assertion within this time window to avoid nPOR from dropping to logic 0 unnecessarily. After the mask time expires, nPOR responds immediately to RDY2. |
| 5. | 1 | 1 | 1 | 1 | 1->RDY# | nPOR remains logic 1 as long as both RDY# are asserted. When either RDY# line deasserts, nPOR follows it. |
|  |  |  |  |  |  | --The next 4 cases are images of the above-- |
| 6. | 0 | 0 | 1 | 0 | 1->0 |  |
| 7. | 0 | 0 | 1 | 1 | 1->0->1 |  |
| 8. | 1 | 0 | 1 | 1 | 1->RDY1 |  |
| 9. | 1 | 1 | 1 | 1 | 1->RDY# |  |

FIG. 6

POWER CONTROL AND STATUS CIRCUITRY FOR COMMUNICATING POWER ON RESET CONTROL AND STATUS VIA A SINGLE ELECTRODE

BACKGROUND

1. Field of the Invention

The present invention relates to power management circuits, and in particular, to power management circuits providing multiple power supply voltages along with control and status signals for providing power on reset control for other circuitry and status signals indicative of the readiness of the various power supply voltages.

2. Related Art

Many systems and applications, particularly those concerned with operating at voltages different from that of the main power source, rely on power management circuits to provide multiple stable and regulated voltages. For example, one common example of such a circuit may include multiple regulated voltage sources in the form of low dropout (LDO) voltage regulators and multiple voltage buck regulators. Following initial enablement of one or more of these power supply regulators, a power on reset signal is provided for initiating a system reset of other, e.g., external, circuitry following enablement and readiness of the power supply voltage sources. Additionally, depending upon the application, it is desirable to monitor the output voltages being provided for any fault conditions. This, however, can result in a packaging problem when a separate interface pin, e.g., integrated circuit pin, is required for each voltage source (e.g., one for enablement plus another for fault monitoring), in addition to the pin needed for the power on reset. This results in a larger package to accommodate all such pins, as well as signal routing issues for the various signals.

Referring to FIG. 1, conventional systems having a power on reset signal and a power good, or ready, status signal operate substantially as represented in the voltage diagrams. As the input voltage VIN increases, power on reset signals nPOR, POR are generated in accordance with their respective voltage thresholds. For example, in the case of a power on reset signal nPOR in which such signal is asserted low, the output signal follows the input voltage VIN until such time t1 the threshold, e.g., 1.2 volt, is crossed, following which the power on reset signal nPOR is asserted (low). Following a predetermined delay interval t1-t3, the power on reset signal nPOR is de-asserted (high). In the case of a power on reset, signal POR is generally needed as a logical inversion of signal nPOR. Meanwhile, the power good, or ready, status signal is asserted at time t2 when the output voltage VOUT has achieved the predetermined level, e.g., 90%.

SUMMARY

In accordance with the presently claimed invention, a system and method are provided for providing, via a single output electrode of an integrated circuit having internal circuitry, a status signal having time multiplexed states indicative of a power on reset condition for external circuitry following enablement of operations of portions of the internal circuitry, and further indicative of subsequent operation statuses of the internal circuitry portions.

In accordance with one embodiment of the presently claimed invention, an integrated circuit having internal circuitry for providing, via a single output electrode, a status signal having time multiplexed states indicative of a power on reset condition for external circuitry following enablement of operations of portions of the internal circuitry, and further indicative of subsequent operation statuses of the internal circuitry portions, including:

shorter delay circuitry responsive to a plurality of ready signals having states indicative of stabilized and non-stabilized states of operations of corresponding portions of the internal circuitry by providing, in accordance with a plurality of shorter time delays, a plurality of corresponding delayed ready signals;

longer delay circuitry responsive to the plurality of ready signals and a plurality of enable signals having states indicative of enabled and non-enabled states of operations of the corresponding portions of the internal circuitry by providing a plurality of corresponding logic signals indicative of the states of respective pairs of one of the plurality of enable signals and one of the plurality of ready signals, and, in accordance with a plurality of longer time delays, a plurality of corresponding delayed logic signals and a plurality of corresponding inverse delayed logic signals; and encoding circuitry coupled to the shorter delay circuitry and the longer delay circuitry, and responsive to the plurality of enable signals, the plurality of ready signals, the plurality of logic signals, the plurality of delayed logic signals, and the plurality of inverse delayed logic signals by providing a status signal having time multiplexed states which are indicative of a power on reset condition for external circuitry following one or more of the enabled states of operations of the corresponding portions of the internal circuitry, and are further indicative of one or more of the stabilized states of operations of the corresponding portions of the internal circuitry, wherein the status signal is in a de-asserted state when each of the plurality of enable signal states is indicative of the non-enabled states of operations of corresponding portions of the internal circuitry, the status signal transitions to and remains in an asserted state, during at least an interval substantially equal to one of the plurality of longer time delays, in response to a first one of the plurality of enable signal states becoming indicative of the enabled state of operation of a first corresponding portion of the internal circuitry, following which, in response to a first one of the plurality of ready signal states being indicative of the stabilized state of operation of the first corresponding portion of the internal circuitry, the status signal transitions to the de-asserted state, during the enabled and stabilized states of operation of the first corresponding portion of the internal circuitry and following a second one of the plurality of enable signal states becoming indicative of the enabled state of operation of a second corresponding portion of the internal circuitry, the status signal remains in the de-asserted state during at least an interval substantially equal to one of the plurality of shorter time delays, following which, in response to a second one of the plurality of ready signal states being indicative of the stabilized state of operation of the second corresponding portion of the internal circuitry, the status signal remains in the de-asserted state, and in response to the second one of the plurality of ready signal states being indicative of the non-stabilized state of operation of the second corresponding portion of the internal circuitry, the status signal transitions to the asserted state, and the status signal transitions to and remains in the asserted state in response to the first and second ones of the plurality of enable signal states concurrently becoming indicative of the enabled states of operations of the first and second corresponding portions of the internal circuitry, following which and after the first one of the plurality of ready signal states becomes and remains indicative of the stabilized state of operation of the first corresponding portion of the internal circuitry during at least an interval substantially equal to one of the plurality of longer time delays, the status signal transitions to the de-asserted state, further following which, in response to one of the first and second ready signal states becoming indicative of the non-stabilized state of operation of one of the first and second corresponding portions of the internal circuitry, the status signal transitions to the asserted state.

In accordance with another embodiment of the presently claimed invention, an integrated circuit having internal circuitry for providing, via a single output electrode, a status signal having time multiplexed states indicative of a power on reset condition for external circuitry following enablement of operations of portions of the internal circuitry, and further indicative of subsequent operation statuses of the internal circuitry portions, including:

a plurality of enablement electrodes to convey a plurality of enable signals having states indicative of enabled and non-enabled states of operations of corresponding portions of the internal circuitry;

a plurality of readiness electrodes to convey a plurality of ready signals having states indicative of stabilized and non-stabilized states of operations of the corresponding portions of the internal circuitry;

an output electrode to convey a status signal having time multiplexed states which are indicative of a power on reset condition for external circuitry following one or more of the enabled states of operations of the corresponding portions of the internal circuitry, and are further indicative of one or more of the stabilized states of operations of the corresponding portions of the internal circuitry;

shorter delay circuitry coupled to the plurality of readiness electrodes and responsive to the plurality of ready signals by providing, in accordance with a plurality of shorter time delays, a plurality of corresponding delayed ready signals;

longer delay circuitry coupled to the plurality of enablement electrodes and the plurality of readiness electrodes, and responsive to the plurality of enable signals and the plurality of ready signals by providing a corresponding plurality of logic signals indicative of the states of respective pairs of one of the plurality of enable signals and one of the plurality of ready signals, and, in accordance with a plurality of longer time delays, a plurality of corresponding delayed logic signals and a plurality of corresponding inverse delayed logic signals; and encoding circuitry coupled to the plurality of enablement electrodes, the plurality of readiness electrodes, the shorter delay circuitry, the longer delay circuitry, and the output electrode, and responsive to the plurality of enable signals, the plurality of ready signals, the plurality of logic signals, the plurality of delayed logic signals, and the plurality of inverse delayed logic signals by providing the status signal, wherein the status signal is in a de-asserted state when each of the plurality of enable signal states is indicative of the non-enabled states of operations of corresponding portions of the internal circuitry, when one of the plurality of enable signal states becomes indicative of the enabled state of operation of a corresponding portion of the internal circuitry, the status signal transitions to and remains in an asserted state during at least an interval substantially equal to one of the plurality of longer time delays, and, if a corresponding one of the plurality of ready signal states has also become and remained indicative of the stabilized state of operation of the corresponding portion of the internal circuitry during at least another interval substantially equal to another of the plurality of longer time delays, the status signal transitions to a de-asserted state, following which the status signal state follows the corresponding one of the plurality of ready signal states, when, after one of the plurality of enable signal states is indicative of the enabled state of operation of a corresponding portion of the internal circuitry and a corresponding one of the plurality of ready signal states has become indicative of the stabilized state of operation of the corresponding portion of the internal circuitry, another of the plurality of enable signal states becomes indicative of the enabled state of operation of another corresponding portion of the internal circuitry, the status signal remains in the de-asserted state during at least an interval substantially equal to one of the plurality of shorter time delays, following which the status signal remains in the de-asserted state so long as each one of the plurality of ready signal states remains indicative of the stabilized states of operation of the corresponding portions of the internal circuitry, and transitions to the asserted state otherwise, and when, substantially concurrently, each one of the plurality of enable signal states becomes indicative of the enabled states of operation of the corresponding portions of the internal circuitry, the status signal transitions to and remains in the asserted state during at least an interval substantially equal to one of the plurality of longer time delays, following which the status signal transitions to the de-asserted state, further following which the status signal transitions to the asserted state in response to one of the plurality of ready signal states becoming indicative of the non-stabilized state of operation of the corresponding portion of the internal circuitry.

In accordance with still another embodiment of the presently claimed invention, a method for providing, via a single output electrode of an integrated circuit having internal circuitry, a status signal having time multiplexed states indicative of a power on reset condition for external circuitry following enablement of operations of portions of the internal circuitry, and further indicative of subsequent operation statuses of the internal circuitry portions, including:

receiving a plurality of ready signals having states indicative of stabilized and non-stabilized states of operations of corresponding portions of the internal circuitry, and in response thereto providing, in accordance with a plurality of shorter time delays, a plurality of corresponding delayed ready signals;

receiving the plurality of ready signals and a plurality of enable signals having states indicative of enabled and non-enabled states of operations of the corresponding portions of the internal circuitry, and in response thereto providing a plurality of corresponding logic signals indicative of the states of respective pairs of one of the plurality of enable signals and one of the plurality of ready signals, and, in accordance with a plurality of longer time delays, a plurality of corresponding delayed logic signals and a plurality of corresponding inverse delayed logic signals; and receiving the plurality of enable signals, the plurality of ready signals, the plurality of logic signals, the plurality of delayed logic signals, and the plurality of inverse delayed logic signals, and in response thereto providing a status signal having time multiplexed states which are indicative of a power on reset condition for external circuitry following one or more of the enabled states of operations of the corresponding portions of the internal circuitry, and are further indicative of one or more of the stabilized states of operations of the corresponding portions of the internal circuitry, wherein the status signal is in a de-asserted state when each of the plurality of enable signal states is indicative of the non-enabled states of operations of corresponding portions of the internal circuitry, the status signal transitions to and remains in an asserted state, during at least an interval substantially equal to one of the plurality of longer time delays, in response to a first one of the plurality of enable signal states becoming indicative of the enabled state of operation of a first corresponding portion of the internal circuitry, following which, in response to a first one of the plurality of ready signal states being indicative of the stabilized state of operation of the first corresponding portion of the internal circuitry, the status signal transitions to the de-asserted state, during the enabled and stabilized states of operation of the first corresponding portion of the internal circuitry and following a second one of the plurality of enable signal states becoming indicative of the enabled state of operation of a second corresponding portion of the internal circuitry, the status signal remains in the de-asserted state during at least an interval substantially equal to one of the plurality of shorter time delays, following which, in response to a second one of the plurality of ready signal states being indicative of the stabilized state of operation of the second corresponding portion of the internal circuitry, the status signal remains in the de-asserted state, and in response to the second one of the plurality of ready signal states being indicative of the non-stabilized state of operation of the second corresponding portion of the internal circuitry, the status signal transitions to the asserted state, and the status signal transitions to and remains in the asserted state in response to the first and second ones of the plurality of enable signal states concurrently becoming indicative of the enabled states of operations of the first and second corresponding portions of the internal circuitry, following which and after the first one of the plurality of ready signal states becomes and remains indicative of the stabilized state of operation of the first corresponding portion of the internal circuitry during at least an interval substantially equal to one of the plurality of longer time delays, the status signal transitions to the de-asserted state, further following which, in response to one of the first and second ready signal states becoming indicative of the non-stabilized state of operation of one of the first and second corresponding portions of the internal circuitry, the status signal transitions to the asserted state.

BRIEF DESCRIPTION OF THE DRAWINGS

FIG. 6 is a table of the possible operating states of the circuitry of FIG. 3.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 1:
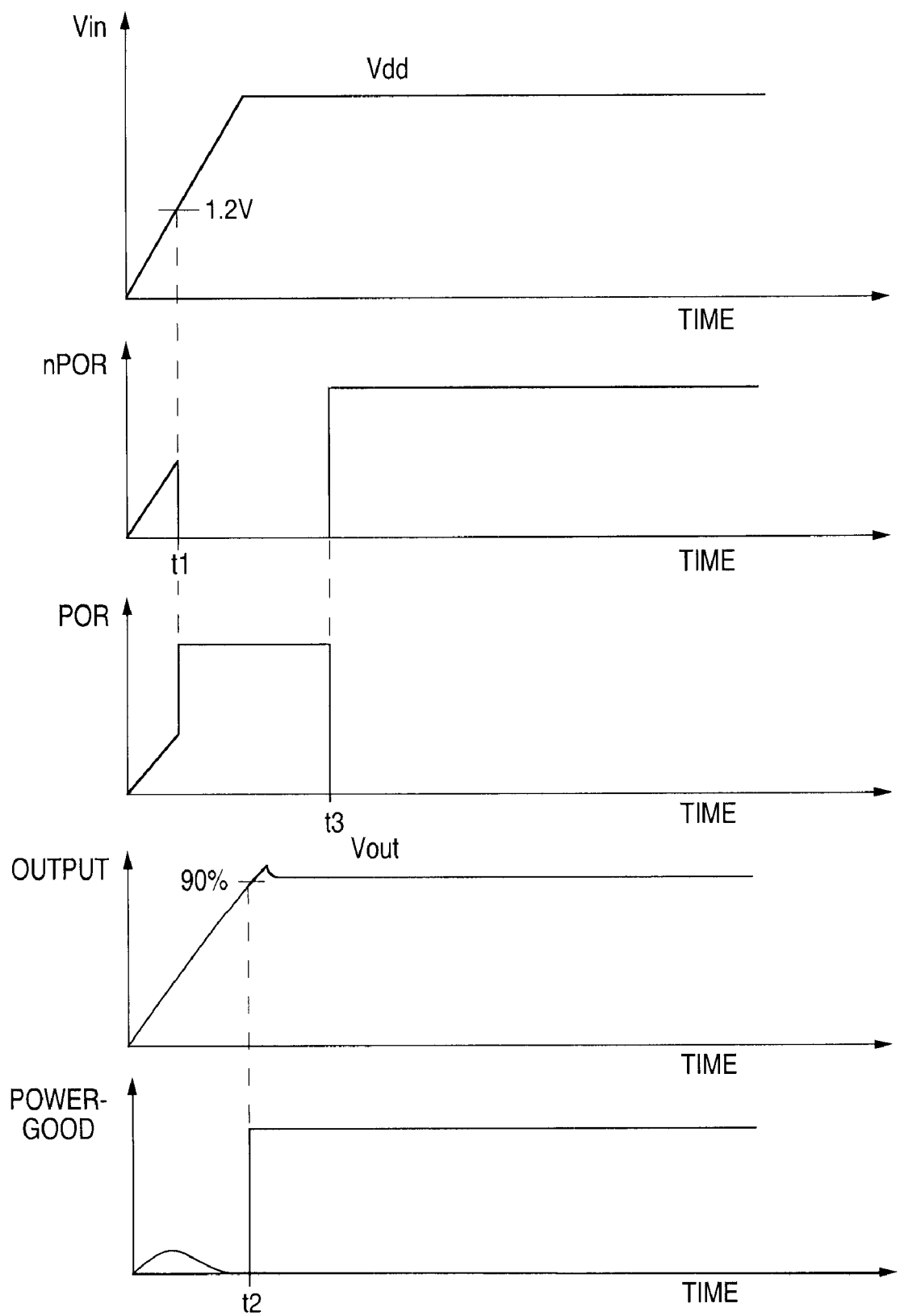
FIG. 1 is a voltage timing diagram for voltage signals in a conventional power management system.
Figure 2:
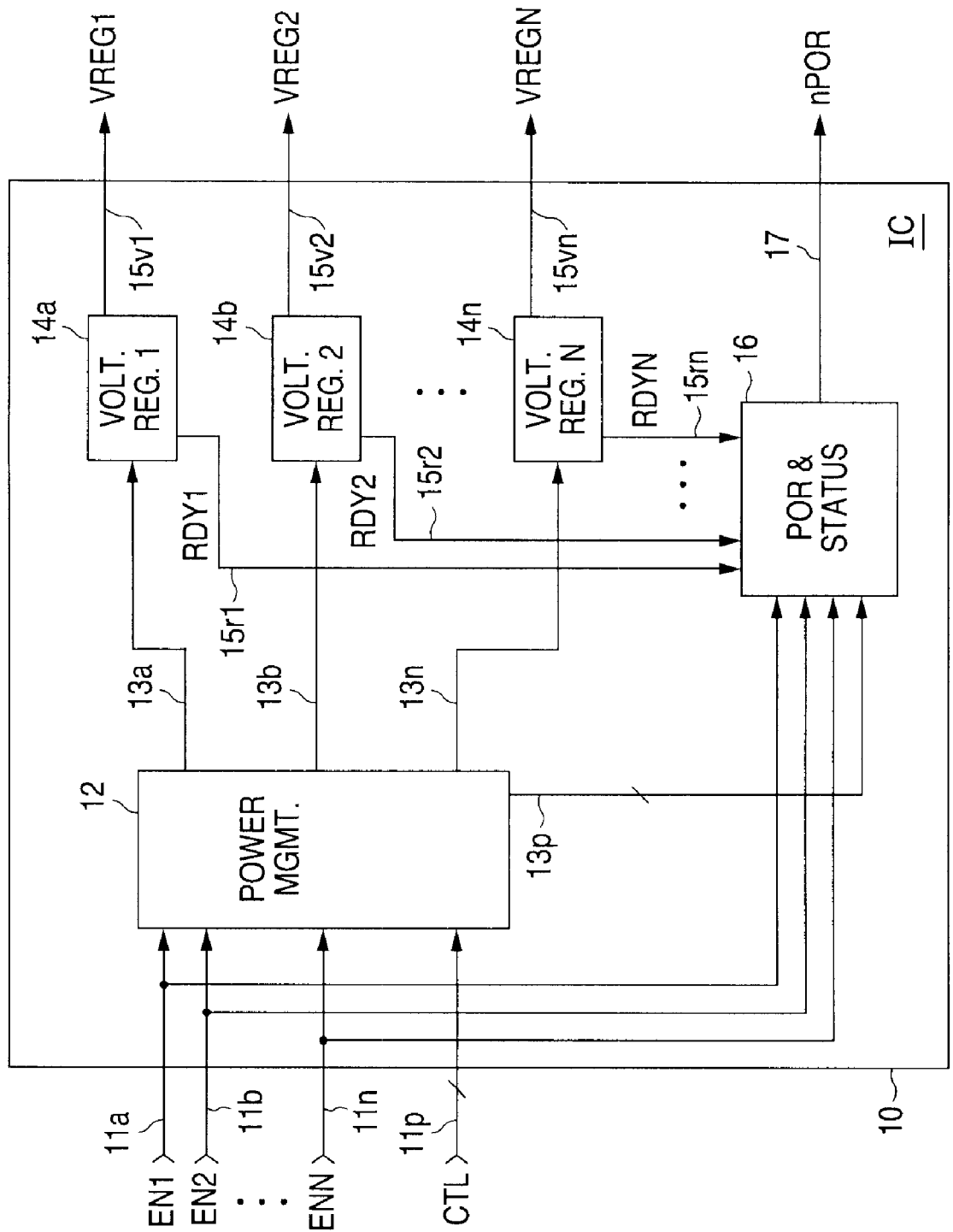
FIG. 2 is a functional block diagram of a power management system in accordance with one embodiment of the presently claimed invention.

Referring to FIG. 2, a power management system 10 in accordance with one embodiment of the presently claimed invention is embodied as, or as part of, an integrated circuit IC containing power management control circuitry 12, voltage regulator circuits 14a, 14b, . . . , 14n, and power on reset and status circuitry 16. Enablement signals 11a, 11b, . . . , 11n are provided to the power management control circuitry 12, which, in turn, provides appropriate control signals 13a, 13b, . . . , 13n to the voltage regulators 14a, 14b, . . . , 14n. Additionally, the power management control circuitry 12 is programmed and otherwise controlled by one or more control signals 11p. The power management control circuitry 12 also provides one or more control signals 13p for the power on reset and status circuitry 16, which also receives the enablement signals 11a, 11b, . . . , 11n.

The voltage regulator circuits 14a, 14b, . . . , 14n provide respective ready status signals 15r1, 15r2, . . . , 15rn to the power on reset and status circuitry 16 to indicate when they have achieved the desired states of readiness, e.g., a predetermined percentage of the desired output voltage level for the output signal 15v1, 15v2, . . . , 15vn. As discussed in more detail below, the power on reset and status circuitry 16, based on the enablement signals 11a, 11b, . . . , 11n and ready signals 15r1, 15r2, . . . , 15rn, provides the power on reset and status signal 17. This signal 17 provides power on reset control for circuitry external to the power management unit 10, as well as provide status information regarding the readiness of the various voltage regulators 14a, 14b, . . . , 14n.

Throughout the following discussion, most signals are deemed asserted when in a logic 1 state, i.e., a higher voltage level, and de-asserted when in a logic 0 state, i.e., at a lower voltage level. However, the power on reset and status output signal 17 is a "negative" logic signal and is, therefore, considered asserted when in its logic 0 state and de-asserted when in its logic 1 state.

Figure 3:
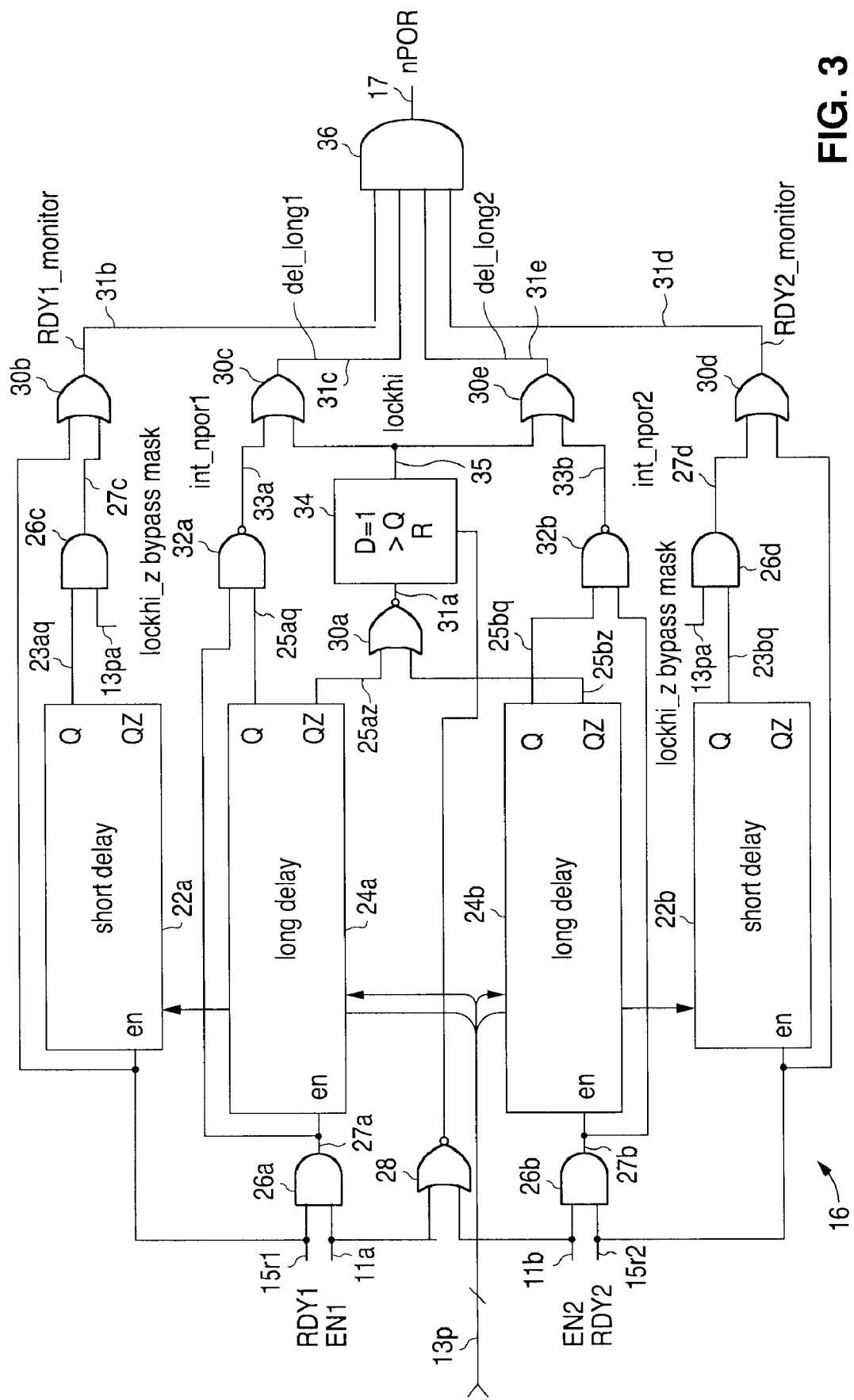
FIG. 3 is a functional block diagram of the power on reset and status signal control circuitry of the circuit of FIG. 2.

Referring to FIG. 3, a preferred embodiment of the power on reset and status circuitry 16 includes delay circuits 22 (22a, 22b, . . . ), 24 (24a, 24b, . . . ), and logic circuits 26, 28, 30, 32, 34, 36, interconnected substantially as shown. As depicted here, and discussed in more detail below, this particular example includes delay circuitry and logic circuits for processing two enablement signals 11a, 11b and two ready signals 15r1, 15r2. However, it will be readily understood by one of ordinary skill in the art that additional delay circuits and logic circuits can be added and interconnected in similar manner so as to accommodate the processing of additional enablement and ready signals. The delay circuits 22, 24 are preferably implemented using monostable multivibrator, or one-shot, circuits. In accordance with a preferred embodiment, the short delay circuits 22 provide delays of approximately 3 milliseconds and the long delay circuits 24 provide delays of approximately 50 milliseconds. However, each of the delays circuits 22, 24 can be programmed in accordance with control signals 13p.

The state of the output signal 17 is regulated in accordance with the independent input signals 11a, 11b, 15r1, 15r2, and the additional variable of time. In this example in which two voltage regulator circuits are used, thereby involving two enablement signals 11a, 11b and two corresponding ready signals 15r1, 15r2, there are 16 possible "static" input conditions, some of which are not realistic conditions (e.g., where an enablement signal is de-asserted but its corresponding ready signal is asserted) and can thus be ignored. However, additional conditions can exist involving the spatial separation and/or overlapping conditional possibilities that can exist among the four independent input signals which can also influence the state of the output signal 17.

Each of the delay circuits 22, 24, operate in a similar manner as follows. When the input EN is a logic 0, the output Q is set at a logic 1, and when the input EN is a logic 1 the internal counter of the delay circuit 22, 24 is started. Upon the end of its count sequence (EOC), the output Q is set to logic 0, which disables the counter such that the output signal Q remains at a logic 0 until the input EN is reset back to a logic 0 state, whereupon the output signal Q is again set to a logic 1.

More specifically, the long delay counters 24 operate as follows. Upon power up of the circuit, whenever the enablement 11 and ready 15r signals are true (asserted), a long delay is initiated by the counters 24. If either of the related enable 11 or ready 15r signals is de-asserted prior to the end of count EOC within the delay circuit 24, the counter resets. The first counter that successfully achieves an uninterrupted end of count sequence sets the flip-flop 34 (via the OR logic gate 30a) and holds the output signals 31c, 31e at logic 1 levels until a system reset occurs, i.e., when all enablement signals 11a, 11b are de-asserted.

The short delay counters 22 provide two types of masking functions. The first masking function is in the form of a bypass delay and is used in the beginning when none of the long delay circuits 24 have achieved a complete end of count sequence and only one enablement signal 11 is asserted. For example, when the first enablement signal 11a is asserted, and with the state of signal 31b following the state of the first ready signal 15r1 by one gate delay, the state of signal 31c is the inversion of the state of the ready signal 15r1 (due to the actions of the long delays circuit 24a, as discussed above, and logic gates 26a, 32a, and 30c), and overlaps the first ready signal 15r1 such that signals 31b and 31c force the power on reset and status signal 17 to a logic 0 state (asserted) until the end of count sequence for the long delay circuit 24a.

Additionally, the short delay circuits 22 provide a masking operation as follows. With just one set of the enablement 11 and ready 15r signals asserted, and the associated long delay end of count sequence completed, signals 31c and 31e are pulled up to a logic 1. Hence, only signals 31b and 31d can affect the state of the output signal 17. For example, after the first enable signal 11a is asserted to a logic 1 state, indicating that the first voltage regulator 14a is powered on and stabilized, the second enablement signal 11b is asserted to a logic 1 state, thereby turning on the second regulator 14b. It will take a finite amount of time (e.g., 1 millisecond) for its ready signal 15r2 to also become asserted. To prevent the output status signal 17 from again becoming asserted to a logic 0 state while awaiting the second voltage regulator 14b to become stabilized, a timing window (e.g., 3 milliseconds) holds the output signal 17 at its de-asserted logic 1 state. After this masking window times out, the output signal 17 follows the state of the second ready signal 15r2, i.e., if the second ready signal 15r2 is asserted at a logic 1, the output status signal 17 remains de-asserted in a logic 1 state, and vice versa.

The output status signal 17 is further affected by the various enablement 11 and ready 15r signals as follows. When neither of the two voltage regulators 14a, 14b is enabled, their enablement signals 11a, 11b are de-asserted at logic 0 states. When one regulator is operating, i.e., after its enablement signal 11 has been asserted, the power on reset signal 17 is immediately asserted and remains in its logic 0 state for at least the duration of the long delay end of count sequence (e.g., 50 milliseconds). This signal 17 is de-asserted to its logic 1 state if and only if the corresponding ready signal 15r remains asserted continuously without any glitches for the duration of the long delay end of count sequence. Thereafter, the output status signal 17 follows the state of the corresponding ready signal 15r.

When one voltage regulator is enabled and its output has become stabilized, i.e., its enablement 11 and ready 15r signals are asserted, and then a second regulator is enabled, as indicated by its corresponding enablement signal 11, the output status signal 17 is not affected by the status of the second regulator and remains in its de-asserted logic 1 state between the time of the assertion of the second enablement signal 11 and the termination of the corresponding short delay end of count sequence. If the first ready signal remains asserted at the end of the short delay count sequence, the output status signal 17 responds to the states of both of the input ready signals 15r1, 15r2, i.e., de-assertion of either ready signal 15r1, 15r2 will cause the power on reset signal 17 to become asserted (logic 0).

If both enablement signals 11a, 11b are asserted concurrently, the power on reset signal 17 becomes asserted (logic 0) and remain so until one of the ready signals 15r1, 15r2 is maintained at its asserted state (logic 1) without interruption for the duration of the long delay count sequence. Following this, the output signal 17 becomes de-asserted (logic 1). Thereafter, the output signal 17 responds to, i.e., follows, the de-assertion of either of the ready signals 15r1, 15r2.

Figure 4:
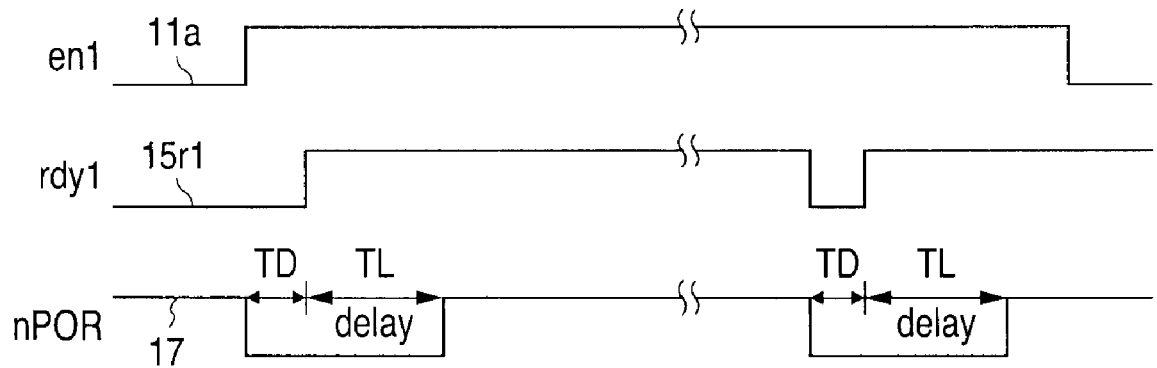
FIG. 4 is a signal timing diagram for operation of the circuit of FIG. 2 in accordance with one embodiment of the presently claimed invention.

Referring to FIG. 4, with reference to the discussion above for operation with only one voltage regulator enabled, the timing and states of the enablement signal 11a, ready signal 15r1 and output signal 17 would appear as shown. As discussed above, the delay interval TL between the rising edge of the ready signal 15r1 and rising edge of the output signal 17 is equal to the long delay end of count sequence. Time interval TD is the time interval associated with the stabilization of the output voltage of the voltage regulator, e.g., the time necessary to achieve the predetermined 90% voltage level.

Figure 5:
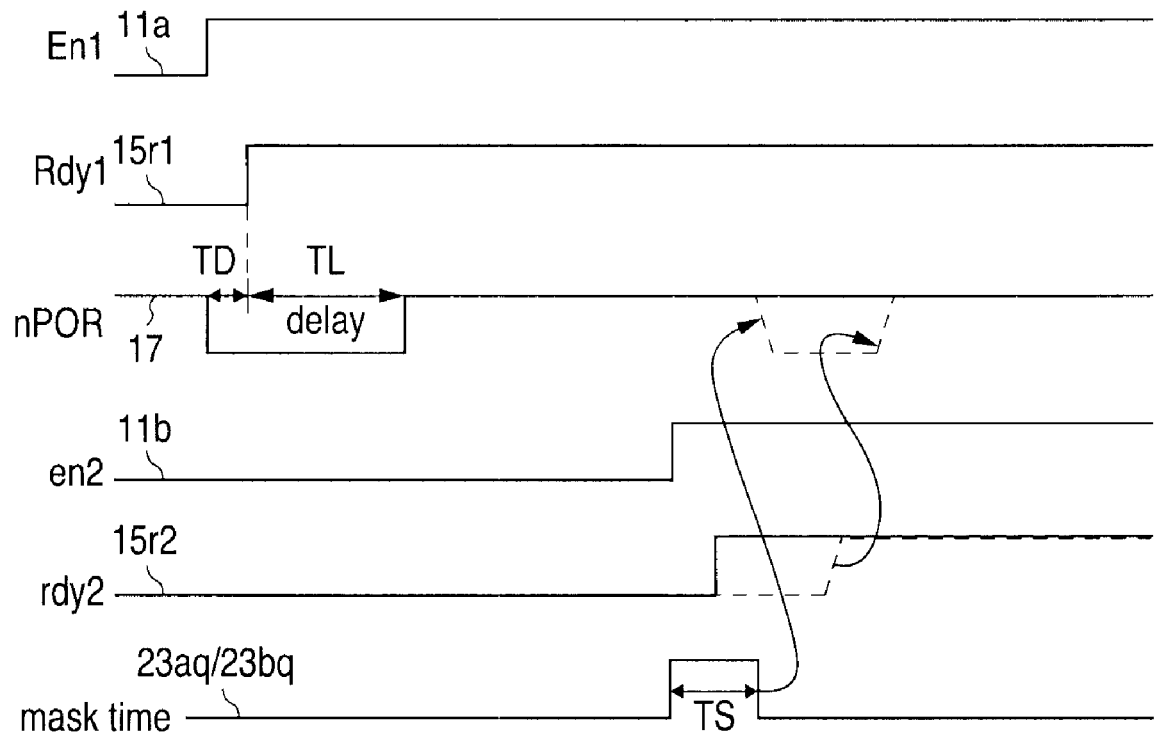
FIG. 5 is a signal timing diagram for operation of the circuit of FIG. 2 in accordance with another embodiment of the presently claimed invention.

Referring to FIG. 5, regarding the discussion above for operation with one regulator enabled and stabilized and second regulator becoming enabled, the corresponding enablement, ready and output signals would appear as shown. As discussed above, if the second ready signal is not asserted during the masking interval TS, as represented by the dashed line, or if it remains de-asserted, then the power on reset signal 17 becomes asserted as represented by the dashed line.

Figure 7:
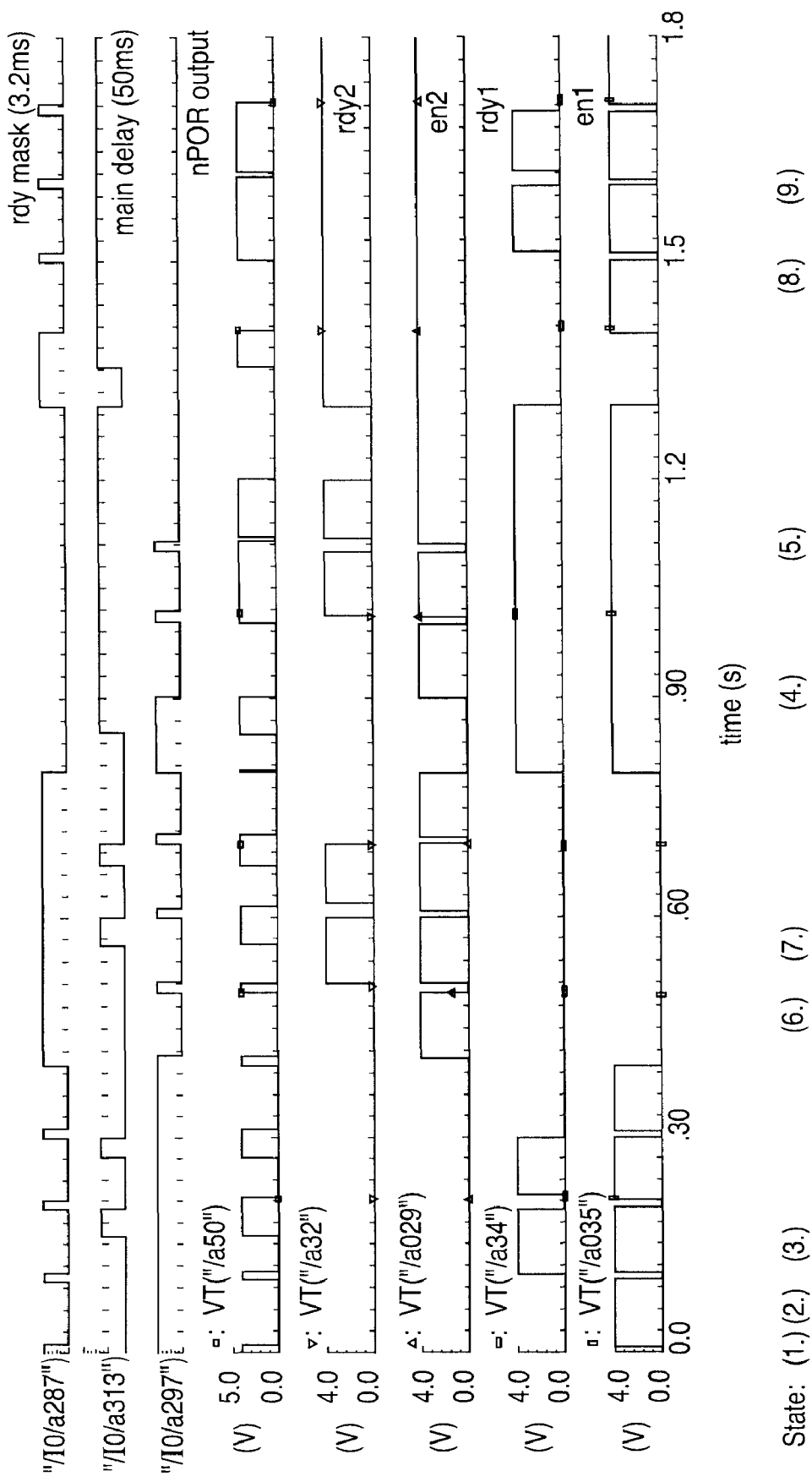
FIG. 7 is a signal timing diagram corresponding to the table of FIG. 6.

Referring to FIGS. 6 and 7, the logic operation and states for the power on reset and status signal 17 can be summarized as shown in the table and depicted as shown in the signal timing diagram.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including an integrated circuit having internal circuitry for providing, via a single output electrode, a status signal having time multiplexed states indicative of a power on reset condition for external circuitry following enablement of operations of portions of said internal circuitry, and further indicative of subsequent operation statuses of said internal circuitry portions, comprising:

shorter delay circuitry responsive to a plurality of ready signals having states indicative of stabilized and non-stabilized states of operations of corresponding portions of said internal circuitry by providing, in accordance with a plurality of shorter time delays, a plurality of corresponding delayed ready signals;

longer delay circuitry responsive to said plurality of ready signals and a plurality of enable signals having states indicative of enabled and non-enabled states of operations of said corresponding portions of said internal circuitry by providing a plurality of corresponding logic signals indicative of said states of respective pairs of one of said plurality of enable signals and one of said plurality of ready signals, and, in accordance with a plurality of longer time delays, a plurality of corresponding delayed logic signals and a plurality of corresponding inverse delayed logic signals; and encoding circuitry coupled to said shorter delay circuitry and said longer delay circuitry, and responsive to said plurality of enable signals, said plurality of ready signals, said plurality of logic signals, said plurality of delayed logic signals, and said plurality of inverse delayed logic signals by providing a status signal having time multiplexed states which are indicative of a power on reset condition for external circuitry following one or more of said enabled states of operations of said corresponding portions of said internal circuitry, and are further indicative of one or more of said stabilized states of operations of said corresponding portions of said internal circuitry, wherein said status signal is in a de-asserted state when each of said plurality of enable signal states is indicative of said non-enabled states of operations of corresponding portions of said internal circuitry, said status signal transitions to and remains in an asserted state, during at least an interval substantially equal to one of said plurality of longer time delays, in response to a first one of said plurality of enable signal states becoming indicative of said enabled state of operation of a first corresponding portion of said internal circuitry, following which, in response to a first one of said plurality of ready signal states being indicative of said stabilized state of operation of said first corresponding portion of said internal circuitry, said status signal transitions to said de-asserted state, during said enabled and stabilized states of operation of said first corresponding portion of said internal circuitry and following a second one of said plurality of enable signal states becoming indicative of said enabled state of operation of a second corresponding portion of said internal circuitry, said status signal remains in said de-asserted state during at least an interval substantially equal to one of said plurality of shorter time delays, following which, in response to a second one of said plurality of ready signal states being indicative of said stabilized state of operation of said second corresponding portion of said internal circuitry, said status signal remains in said de-asserted state, and in response to said second one of said plurality of ready signal states being indicative of said non-stabilized state of operation of said second corresponding portion of said internal circuitry, said status signal transitions to said asserted state, and said status signal transitions to and remains in said asserted state in response to said first and second ones of said plurality of enable signal states concurrently becoming indicative of said enabled states of operations of said first and second corresponding portions of said internal circuitry, following which and after said first one of said plurality of ready signal states becomes and remains indicative of said stabilized state of operation of said first corresponding portion of said internal circuitry during at least an interval substantially equal to one of said plurality of longer time delays, said status signal transitions to said de-asserted state, further following which, in response to one of said first and second ready signal states becoming indicative of said non-stabilized state of operation of one of said first and second corresponding portions of said internal circuitry, said status signal transitions to said asserted state.

2. The apparatus of claim 1, wherein said shorter delay circuitry comprises a plurality of monostable multivibrator circuits responsive to said plurality of ready signals by providing said plurality of corresponding delayed ready signals.

3. The apparatus of claim 1, wherein said longer delay circuitry comprises logic circuitry responsive to said respective pairs of one of said plurality of enable signals and one of said plurality of ready signals by providing said plurality of corresponding logic signals.

4. The apparatus of claim 1, wherein said longer delay circuitry comprises a plurality of monostable multivibrator circuits responsive to said plurality of corresponding logic signals by providing said plurality of corresponding delayed logic signals and said plurality of corresponding inverse delayed logic signals.

5. The apparatus of claim 1, wherein said encoding circuitry comprises a plurality of combinational logic circuits.

6. An apparatus including an integrated circuit having internal circuitry for providing, via a single output electrode, a status signal having time multiplexed states indicative of a power on reset condition for external circuitry following enablement of operations of portions of said internal circuitry, and further indicative of subsequent operation statuses of said internal circuitry portions, comprising:

a plurality of enablement electrodes to convey a plurality of enable signals having states indicative of enabled and non-enabled states of operations of corresponding portions of said internal circuitry;

a plurality of readiness electrodes to convey a plurality of ready signals having states indicative of stabilized and non-stabilized states of operations of said corresponding portions of said internal circuitry;

an output electrode to convey a status signal having time multiplexed states which are indicative of a power on reset condition for external circuitry following one or more of said enabled states of operations of said corresponding portions of said internal circuitry, and are further indicative of one or more of said stabilized states of operations of said corresponding portions of said internal circuitry;

shorter delay circuitry coupled to said plurality of readiness electrodes and responsive to said plurality of ready signals by providing, in accordance with a plurality of shorter time delays, a plurality of corresponding delayed ready signals;

longer delay circuitry coupled to said plurality of enablement electrodes and said plurality of readiness electrodes, and responsive to said plurality of enable signals and said plurality of ready signals by providing a corresponding plurality of logic signals indicative of said states of respective pairs of one of said plurality of enable signals and one of said plurality of ready signals, and, in accordance with a plurality of longer time delays, a plurality of corresponding delayed logic signals and a plurality of corresponding inverse delayed logic signals; and encoding circuitry coupled to said plurality of enablement electrodes, said plurality of readiness electrodes, said shorter delay circuitry, said longer delay circuitry, and said output electrode, and responsive to said plurality of enable signals, said plurality of ready signals, said plurality of logic signals, said plurality of delayed logic signals, and said plurality of inverse delayed logic signals by providing said status signal, wherein said status signal is in a de-asserted state when each of said plurality of enable signal states is indicative of said non-enabled states of operations of corresponding portions of said internal circuitry, when one of said plurality of enable signal states becomes indicative of said enabled state of operation of a corresponding portion of said internal circuitry, said status signal transitions to and remains in an asserted state during at least an interval substantially equal to one of said plurality of longer time delays, and, if a corresponding one of said plurality of ready signal states has also become and remained indicative of said stabilized state of operation of said corresponding portion of said internal circuitry during at least another interval substantially equal to another of said plurality of longer time delays, said status signal transitions to a de-asserted state, following which said status signal state follows said corresponding one of said plurality of ready signal states, when, after one of said plurality of enable signal states is indicative of said enabled state of operation of a corresponding portion of said internal circuitry and a corresponding one of said plurality of ready signal states has become indicative of said stabilized state of operation of said corresponding portion of said internal circuitry, another of said plurality of enable signal states becomes indicative of said enabled state of operation of another corresponding portion of said internal circuitry, said status signal remains in said de-asserted state during at least an interval substantially equal to one of said plurality of shorter time delays, following which said status signal remains in said de-asserted state so long as each one of said plurality of ready signal states remains indicative of said stabilized states of operation of said corresponding portions of said internal circuitry, and transitions to said asserted state otherwise, and when, substantially concurrently, each one of said plurality of enable signal states becomes indicative of said enabled states of operation of said corresponding portions of said internal circuitry, said status signal transitions to and remains in said asserted state during at least an interval substantially equal to one of said plurality of longer time delays, following which said status signal transitions to said de-asserted state, further following which said status signal transitions to said asserted state in response to one of said plurality of ready signal states becoming indicative of said non-stabilized state of operation of said corresponding portion of said internal circuitry.

7. The apparatus of claim 6, wherein said shorter delay circuitry comprises a plurality of monostable multivibrator circuits responsive to said plurality of ready signals by providing said plurality of corresponding delayed ready signals.

8. The apparatus of claim 6, wherein said longer delay circuitry comprises logic circuitry responsive to said respective pairs of one of said plurality of enable signals and one of said plurality of ready signals by providing said plurality of corresponding logic signals.

9. The apparatus of claim 6, wherein said longer delay circuitry comprises a plurality of monostable multivibrator circuits responsive to said plurality of corresponding logic signals by providing said plurality of corresponding delayed logic signals and said plurality of corresponding inverse delayed logic signals.

10. The apparatus of claim 6, wherein said encoding circuitry comprises a plurality of combinational logic circuits.

11. A method for providing, via a single output electrode of an integrated circuit having internal circuitry, a status signal having time multiplexed states indicative of a power on reset condition for external circuitry following enablement of operations of portions of said internal circuitry, and further indicative of subsequent operation statuses of said internal circuitry portions, comprising:

receiving a plurality of ready signals having states indicative of stabilized and non-stabilized states of operations of corresponding portions of said internal circuitry, and in response thereto providing, in accordance with a plurality of shorter time delays, a plurality of corresponding delayed ready signals;

receiving said plurality of ready signals and a plurality of enable signals having states indicative of enabled and non-enabled states of operations of said corresponding portions of said internal circuitry, and in response thereto providing a plurality of corresponding logic signals indicative of said states of respective pairs of one of said plurality of enable signals and one of said plurality of ready signals, and, in accordance with a plurality of longer time delays, a plurality of corresponding delayed logic signals and a plurality of corresponding inverse delayed logic signals; and receiving said plurality of enable signals, said plurality of ready signals, said plurality of logic signals, said plurality of delayed logic signals, and said plurality of inverse delayed logic signals, and in response thereto providing a status signal having time multiplexed states which are indicative of a power on reset condition for external circuitry following one or more of said enabled states of operations of said corresponding portions of said internal circuitry, and are further indicative of one or more of said stabilized states of operations of said corresponding portions of said internal circuitry, wherein said status signal is in a de-asserted state when each of said plurality of enable signal states is indicative of said non-enabled states of operations of corresponding portions of said internal circuitry, said status signal transitions to and remains in an asserted state, during at least an interval substantially equal to one of said plurality of longer time delays, in response to a first one of said plurality of enable signal states becoming indicative of said enabled state of operation of a first corresponding portion of said internal circuitry, following which, in response to a first one of said plurality of ready signal states being indicative of said stabilized state of operation of said first corresponding portion of said internal circuitry, said status signal transitions to said de-asserted state, during said enabled and stabilized states of operation of said first corresponding portion of said internal circuitry and following a second one of said plurality of enable signal states becoming indicative of said enabled state of operation of a second corresponding portion of said internal circuitry, said status signal remains in said de-asserted state during at least an interval substantially equal to one of said plurality of shorter time delays, following which, in response to a second one of said plurality of ready signal states being indicative of said stabilized state of operation of said second corresponding portion of said internal circuitry, said status signal remains in said de-asserted state, and in response to said second one of said plurality of ready signal states being indicative of said non-stabilized state of operation of said second corresponding portion of said internal circuitry, said status signal transitions to said asserted state, and said status signal transitions to and remains in said asserted state in response to said first and second ones of said plurality of enable signal states concurrently becoming indicative of said enabled states of operations of said first and second corresponding portions of said internal circuitry, following which and after said first one of said plurality of ready signal states becomes and remains indicative of said stabilized state of operation of said first corresponding portion of said internal circuitry during at least an interval substantially equal to one of said plurality of longer time delays, said status signal transitions to said de-asserted state, further following which, in response to one of said first and second ready signal states becoming indicative of said non-stabilized state of operation of one of said first and second corresponding portions of said internal circuitry, said status signal transitions to said asserted state.

12. The method of claim 11, wherein said receiving a plurality of ready signals having states indicative of stabilized and non-stabilized states of operations of corresponding portions of said internal circuitry, and in response thereto providing, in accordance with a plurality of shorter time delays, a plurality of corresponding delayed ready signals comprises triggering a plurality of monostable multivibrator circuits with said plurality of ready signals to provide said plurality of corresponding delayed ready signals.

13. The method of claim 11, wherein said receiving said plurality of ready signals and a plurality of enable signals having states indicative of enabled and non-enabled states of operations of said corresponding portions of said internal circuitry, and in response thereto providing a plurality of corresponding logic signals indicative of said states of respective pairs of one of said plurality of enable signals and one of said plurality of ready signals, and, in accordance with a plurality of longer time delays, a plurality of corresponding delayed logic signals and a plurality of corresponding inverse delayed logic signals comprises logically processing said respective pairs of one of said plurality of enable signals and one of said plurality of ready signals to provide said plurality of corresponding logic signals.

14. The method of claim 11, wherein said receiving said plurality of ready signals and a plurality of enable signals having states indicative of enabled and non-enabled states of operations of said corresponding portions of said internal circuitry, and in response thereto providing a plurality of corresponding logic signals indicative of said states of respective pairs of one of said plurality of enable signals and one of said plurality of ready signals, and, in accordance with a plurality of longer time delays, a plurality of corresponding delayed logic signals and a plurality of corresponding inverse delayed logic signals comprises triggering a plurality of monostable multivibrator circuits with said plurality of corresponding logic signals to provide said plurality of corresponding delayed logic signals and said plurality of corresponding inverse delayed logic signals.

15. The method of claim 11, wherein said receiving said plurality of enable signals, said plurality of ready signals, said plurality of logic signals, said plurality of delayed logic signals, and said plurality of inverse delayed logic signals, and in response thereto providing a status signal having time multiplexed states which are indicative of a power on reset condition for external circuitry following one or more of said enabled states of operations of said corresponding portions of said internal circuitry, and are further indicative of one or more of said stabilized states of operations of said corresponding portions of said internal circuitry comprises logically processing selected combinations of said plurality of enable signals, said plurality of ready signals, said plurality of logic signals, said plurality of delayed logic signals, and said plurality of inverse delayed logic signals.

* * * * *